A. G. BECKMAN.
FLUID PRESSURE REGULATOR.
APPLICATION FILED SEPT. 24, 1908.
920,716.
Patented May 4, 1909.
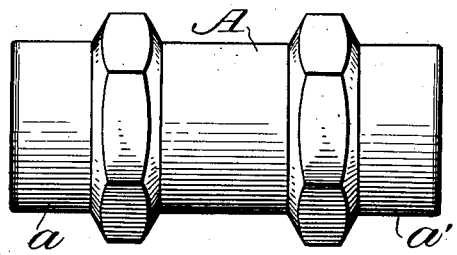
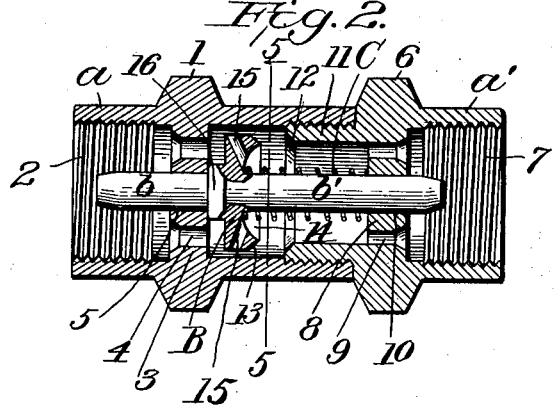
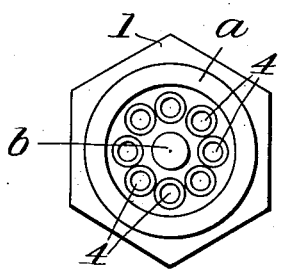
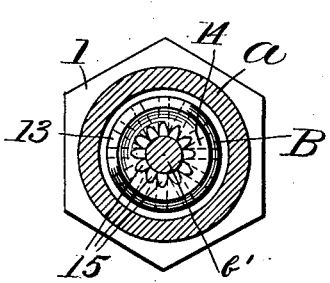
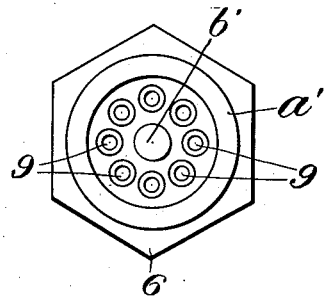
Witnesses
C. H. Walker
Newton P. Willis
Inventor
A. G. Beckman
By Robert Watson
Attorney

UNITED STATES PATENT OFFICE.

ADOLPH G. BECKMAN, OF BALTIMORE, MARYLAND, ASSIGNOR OF ONE-HALF TO JULIUS LEVY, OF BALTIMORE, MARYLAND.

FLUID-PRESSURE REGULATOR.

No. 920,716.     Specification of Letters Patent.     Patented May 4, 1909.

Application filed September 24, 1908. Serial No. 454,608.

*To all whom it may concern:*

Be it known that I, ADOLPH G. BECKMAN, a citizen of the United States, residing at Baltimore, in the State of Maryland, have invented certain new and useful Improvements in Fluid-Pressure Regulators, of which the following is a specification.

This invention relates to fluid pressure regulators, adapted particularly for regulating the pressure of illuminating gas in houses, and it consists of certain improvements the details of which will be pointed out in the following specification, taken in connection with the accompanying drawing, in which, Figure 1 is a side view of the pressure regulator; Fig. 2 is a central longitudinal section through the same; Fig. 3 is an end view of the regulator, looking from left to right in Figs. 1 and 2; Fig. 4 is a similar view looking from right to left in Figs. 1 and 2; and, Fig. 5 is a section on the line 5—5 of Fig. 2.

Referring to the drawing A indicates a tubular valve casing, composed of the parts $a$ and $a'$; B indicates a valve, within the casing and C indicates a spring arranged to normally hold the valve away from its seat, against the pressure of the fluid.

The part $a$ of the casing has an external angular boss 1, forming a nut to which a wrench may be applied for turning the part, and it has at one end an interior thread 2 by which said part may be connected to a gas pipe. A partition 3 extends across the interior of the part or member $a$ and this partition is provided with a circular series of orifices 4 to permit the gas to flow through the same and also with a central guide opening 5 for the part $b$ of the valve stem. The part $a'$ of the casing also has a nut 6 on its exterior and an internal thread 7 for connection to a gas-pipe. It also has a transverse partition 8, a circular series of openings 9, of smaller diameter than the openings 4, and a central guide opening 10 is provided in the partition for the part $b'$ of the valve stem. The end portion 11 of the part $a'$ of the casing, is threaded into the part $a$, as shown, and said end portion is provided with a valve seat 12 adapted to be engaged by the beveled face 13 on the valve.

The valve B is cylindrical and is preferably made integral with the valve stem, $b$, $b'$, which latter, fitting within the guide openings 5 and 10, supports the valve and guides it in its movements toward and from its seat. The valve, as shown, is of smaller diameter than the interior of the casing so as to permit the gas to flow around the sides of the valve through the casing when the valve is in its normal position. A series of small perforations or openings 15 extend from the periphery of the valve in a radial direction to the concave side 14 of the valve, near the valve stem. The spring C is coiled around the part $b'$ of the valve stem and is interposed between the partition 8 and the concave side of the valve. This spring normally tends to force the valve toward the partition 3 but the valve is held out of engagement with said partition by a boss 16 on the valve stem which abuts against said partition, and forms a stop.

In operation the part $a$ of the casing is connected to the pipe leading from the gas meter, and the part $a'$ of the casing is connected to the main pipe which conveys the gas to the burners in the dwelling or other building, so that the gas, in flowing from the meter to the burners, passes first through the part $a$ of the casing and then through the part $a'$. The nut 6 on the part $a'$ fits, gas tight, against the end of the part $a$. The stop 16 holds the valve at a short distance from the inlet openings 4 so that these openings are never closed by the valve. The tension of the spring C is adjusted, before the regulator is put in service, for any desired pressure at the burners, and as long as the pressure at the burners is normal this spring holds the valve in the position shown in Fig. 2, with the stop 16 against the partition 3. The gas then flows freely through the openings 4 and around the periphery of the valve and through the outlet openings 9. When the pressure increases above the normal the valve is forced by the gas pressure toward the seat 12, and when the pressure exceeds a certain predetermined amount, which is regulated by the tension of the spring C, the valve closes against the seat 12 and prevents the further flow of gas past the periphery of the valve. When this occurs, a restricted flow of gas will take place through the radial openings 15 which are provided to permit a limited amount of gas to pass through the valve when the latter is seated. The friction of the gas against the walls of the numerous small orifices in the valve and the tortuous path of the gas throttles the flow so that the pressure at the outlet side of the valve is considerable less than the pressure at the inlet side when the valve is closed. When the pressure at the inlet side of the valve falls, the valve opens and the flow around the periphery of the valve, past the valve seat, is again established. The openings 4 are made large in order to permit the gas to flow freely into the casing of the regulator, and the orifices 15 are arranged in a radial direction, instead of extending straight through the valve, so that the gas pressure will act upon the full area of the valve at the inlet side, to operate the valve, and the gas cannot blow straight through the valve when the latter is closed, but must pass to the periphery and thence back through the small orifices to the center, and thence through the openings 9 which are made smaller than the openings 4.

What I claim is:—

1. In a fluid pressure regulator, a tubular casing comprising two parts detachably fitted together, said parts having partitions provided with central guide openings and openings for the passage of the fluid, one of said parts having also a valve seat, a valve stem movable in said guide openings, a valve on said stem of smaller diameter than the diameter of the adjacent wall of the casing so as to provide an annular space for the flow of fluid around the periphery of the valve, said valve having its outlet side dished or concave, and having an annular surface adapted to engage said seat and having also a series of perforations extending from its periphery to its concave side, a spring arranged to hold said valve away from its seat, and a stop arranged to hold the valve away from the openings in the partition at the inlet side of the casing.

2. In a fluid pressure regulator, a casing comprising two tubular parts detachably fitted together, said parts having transverse partitions provided with central guide openings and openings for the passage of fluid, the area of the openings for the passage of the fluid at the outlet side of the casing being less than the area of the openings at the inlet side, one part of said casing having a valve seat, a valve stem movable in said guide openings, a valve upon said stem adapted to engage said seat, said valve being of less diameter than the diameter of the adjacent wall of the casing, to provide a passageway for fluid around the periphery of the valve, and having a series of openings extending from its periphery to the outlet side of the valve, a spring for holding said valve away from its seat and a stop for holding said valve away from the openings in the partition at the inlet side of the casing.

3. In a fluid pressure regulator, a casing comprising two tubular parts having transverse partitions provided with central guide openings and openings for the passage of fluid, one of said parts fitting within the other and having a valve seat, a valve stem fitting within said guide openings, a valve upon said stem, the diameter of said valve being less than the internal diameter of the adjacent wall of the casing so as to provide an annular space for the flow of fluid between the periphery of the valve and the casing, said valves having an annular surface adapted to fit against said seat and having a series of perforations extending from its periphery to the outlet side of the valve between said surface and the stem, a spring arranged to normally hold said valve away from its seat, and a stop for holding said valve away from the openings in the partition at the inlet side of the valve.

4. In a fluid pressure regulator, a casing comprising two tubular parts having transverse partitions provided with central guide openings and openings for the passage of fluid, one of said parts fitting within the other and having a valve seat, a valve stem fitting within said guide openings, a valve upon said stem, a diameter of said valve being less than the internal diameter of the adjacent wall of the casing so as to provide an annular space for the flow of fluid between the periphery of the valve and the casing, said valve having its outlet side concave or dished and having an annular surface adapted to fit against said seat and having also a series of perforations extending from its periphery to the concave surface of the valve, a spring fitting between said concave surface and one of said partitions and a stop for holding said valve away from the openings in the other of said partitions.

In testimony whereof I affix my signature, in presence of two witnesses.

ADOLPH G. BECKMAN.

Witnesses:
EDW J. STORCK,
ROBERT WATSON.